United States Patent

Proctor

[11] Patent Number: 5,613,510
[45] Date of Patent: Mar. 25, 1997

[54] TANK INTERNAL SURFACE CLEANING SYSTEM

[76] Inventor: Ronald E. Proctor, P.O. Box 1423, High Point, N.C. 27261

[21] Appl. No.: 541,305

[22] Filed: Oct. 10, 1995

[51] Int. Cl.$^6$ .................... B08B 9/08; B08B 3/02
[52] U.S. Cl. .................... 134/166 R; 406/39; 406/146
[58] Field of Search .................... 134/166 R, 169 R; 406/39, 136, 137, 145, 146; 222/195

[56] References Cited

U.S. PATENT DOCUMENTS

| | | | |
|---|---|---|---|
| D. 317,967 | 7/1991 | Pelletier . | |
| 1,666,015 | 4/1928 | Land | 134/169 R X |
| 3,860,018 | 1/1975 | Reiter | 134/166 R X |
| 3,897,599 | 8/1975 | Artzer . | |
| 4,550,453 | 11/1985 | Norman | 4/323 |
| 4,667,351 | 5/1987 | Williams . | |
| 4,905,325 | 3/1990 | Colditz | 134/166 R X |
| 4,913,819 | 4/1990 | Patterson | 134/166 R X |
| 5,199,826 | 4/1993 | Lawrence | 406/137 X |
| 5,203,361 | 4/1993 | Tickle . | |
| 5,211,337 | 5/1993 | Lukez . | |
| 5,222,512 | 6/1993 | McGregor | 134/166 R |
| 5,346,101 | 9/1994 | Hargis et al. | 134/166 R X |

FOREIGN PATENT DOCUMENTS

| | | | |
|---|---|---|---|
| 91287 | 8/1978 | Japan | 406/137 |

OTHER PUBLICATIONS

Brochure entitled "Malibu LifeTime Crib", undated.

*Primary Examiner*—Philip R. Coe
*Attorney, Agent, or Firm*—Rhodes Coats & Bennett, L.L.P.

[57] ABSTRACT

A system for cleaning an interior of a holding tank particularly in recreational vehicles. The apparatus includes a holding tank for retaining fluids and a fluid distribution assembly which extends through the tank for dispensing pressurized fluid against an interior thereof. The fluid distribution assembly comprises a main fluid conduit which is connected to a plurality of lateral conduits by a series of vertical conduits and upper and lower T-connectors. The lateral conduits have openings positioned along the body of the conduits and at least one opening at each outer distal end of the conduits. The openings in the conduits allow a pressured spray of fluid like water to be released from the fluid distribution assembly and into the interior space of the holding tank.

28 Claims, 3 Drawing Sheets

TANK INTERNAL SURFACE CLEANING SYSTEM

BACKGROUND OF THE INVENTION (1) Field of the Invention

The present invention relates to fluid cleaning devices. More particularly, the present invention relates to a tank internal surface cleaning system for effecting cleaning of an interior of a holding tank.

(2) Description of the Prior Art

The use of fluid cleaning devices is known in the prior art. More specifically, fluid cleaning devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art fluid cleaning devices include U.S. Pat. No. 5,203,361; U.S. Pat. No. 3,897,599; U.S. Pat. No. 5,211,337; U.S. Pat. No. 4,550,453; U.S. Pat. No. 4,667,351; and U.S. Pat. No. Des. 317,967.

While these devices fulfill their respective particular objectives and requirements, the aforementioned patents do not disclose a tank internal surface rinsing system for effecting rinsing of an interior of a holding tank, which includes a holding tank for retaining fluids, and a water distribution assembly extending through the tank for dispensing pressurized water against an interior thereof. The water distribution assembly includes a main fluid dispensing conduit and lateral dispensing conduits extending within the tank for spraying water upon interior surfaces thereof.

In these respects, the tank internal surface cleaning system according to the present invention substantially departs from the conventional concepts and designs of the prior art, and in so doing, provides an apparatus primarily developed for the purpose of effecting cleaning of an interior of a holding tank.

SUMMARY OF THE INVENTION

The present invention provides a novel tank internal surface cleaning system, which can be utilized for cleaning an interior of a holding tank or the like, particularly in recreational vehicles. The system includes a holding tank for retaining fluids and a fluid distribution assembly which extends through the tank's interior for dispensing pressurized fluid against an interior thereof. The fluid distribution assembly comprises an elongated main fluid dispensing conduit which is connected to a plurality of lateral conduits by a series of vertical conduits and upper and lower T-connectors. The lateral conduits have a plurality of openings positioned along the body of the conduits and at least one opening at each outer distal end of the conduits. The openings permit a pressured spraying of fluid, for example, water to be released from the conduits and onto the interior surfaces of the holding tank.

The fluid distribution assembly comprises an elongated main fluid conduit extending through an interior of the holding tank; and a plurality of lateral conduits positioned in fluid communication with the elongated main fluid conduit and projecting laterally thereof for distributing fluid towards opposed side walls of the holding tank, the lateral conduits each having a plurality of openings positioned along the body of the conduit and at least one opening at each outer distal end of the conduit.

The tank internal surface cleaning system includes a fluid coupling projecting exteriorly of the holding tank for connecting the fluid distribution assembly to a fluid supply conduit. The fluid coupling comprises flexible tubing connected at one end to an elongated main fluid conduit; a threaded coupling connected to a second end of the flexible tubing; and a fluid supply conduit connected to the opposite end of the threaded coupling. The flexible tubing comprises transparent material, for example, plastic tubing, but may be made of any type of material which is flexible in nature. The cleaning system includes end caps each enclosing the outer distal ends of the lateral conduits, and having at least one opening.

The dimensions of the tank internal surface cleaning system are between about 18 inches to about 25 inches wide, about 50 inches to about 60 inches long, and about 2 inches to about 8 inches high. However, the overall dimensions may vary depending upon the size of the manufacturer's holding tank.

The present invention overcomes the current holding tank cleaning systems in several respects. First, removal of waste materials is carried out in a much cleaner and more efficient manner with a cleaning system that is installed within the interior of the holding tank. Filling up the holding tank with water through the commode several times to discharge the waste is no longer necessary. Second, odors and residual waste typically left behind with existing systems are eliminated with the cleaning system of the present invention.

In one embodiment, the openings in the lateral conduits range between ⅛ inch to about ¼ inch in diameter.

In another embodiment, the fluid distribution assembly further comprises a plurality of upper T-connectors each coupled to the elongated main fluid conduit; a plurality of lower T-connectors each coupled to at least one lateral conduit; and a plurality of vertical conduits each having upper and lower ends with the upper end connected to the elongated main fluid conduit by an upper T-connector and the lower end connected to at least one lateral conduit by a lower T-connector.

In yet another embodiment, the elongated main fluid conduit is between approximately 34 inches and 50 inches in length.

In another embodiment, the lateral conduits are between approximately 18 and 30 inches in length.

In still another embodiment, the vertical conduits are between approximately 2 and 8 inches in length.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
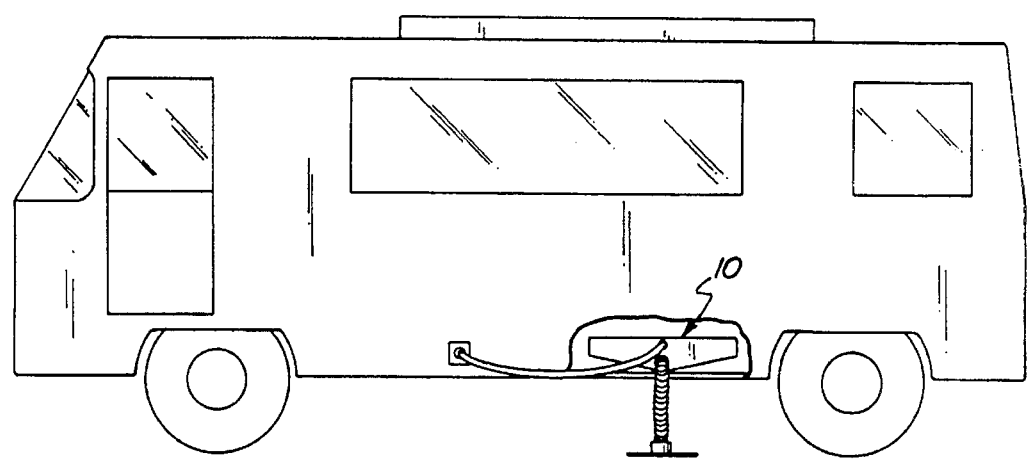
FIG. 1 is a side elevation view of a tank internal surface rinsing system according to the present invention in use.

With reference now to the drawings, and in particular to FIGS. 1–6 thereof, a novel tank internal surface cleaning system embodying the principles and concepts of the present invention and generally designated by the reference numeral 10 will be described.

Figure 2:
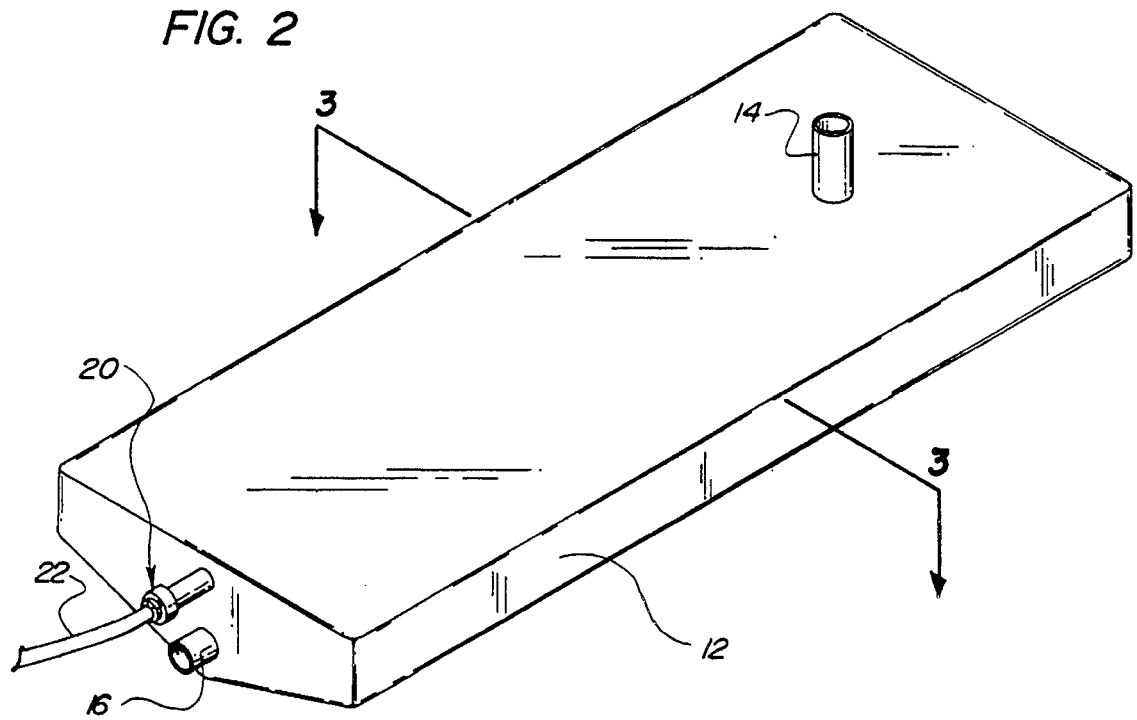
FIG. 2 is an isometric illustration of the invention.
Figure 3:
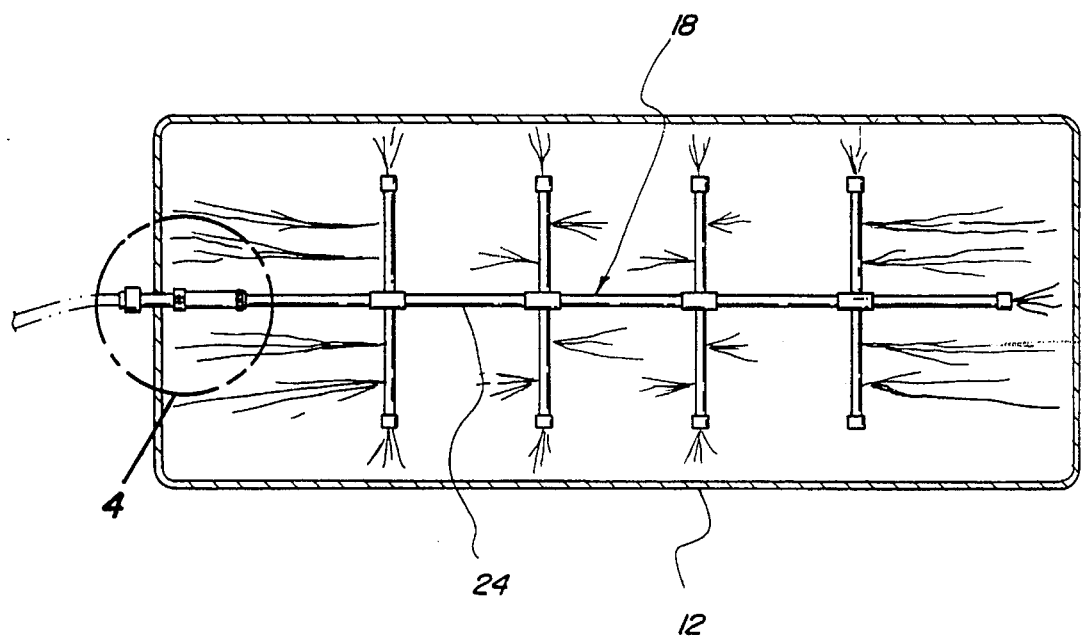
FIG. 3 is a cross sectional taken along line 3—3 of FIG. 2.

More specifically, it will be noted that the tank internal surface cleaning system 10 comprises a holding tank 12 for receiving fluids from a recreational vehicle or the like such as is illustrated in FIG. 1 of the drawings. The holding tank 12 includes a fluid inlet 14, and a drain outlet 16 extending into fluid communication with the tank's interior. As shown in FIG. 3, the tank internal surface cleaning system 10 further comprises a fluid distribution assembly 18 which is mounted within the holding tank 12 and functions by directing pressurized fluids like water towards interior surfaces of the holding tank so as to effect cleaning thereof. The tank internal surface cleaning system 10, as shown in FIGS. 2 and 3, further includes a fluid coupling 20 projecting exteriorly of the holding tank 12 for connecting the fluid distribution assembly 18 to a fluid supply conduit 22. By this structure, an individual can effect cleaning of the interior of the holding tank 12 simply by injecting pressurized fluid from a fluid supply conduit 22, for example, a garden hose, into the water distribution assembly 18 through the fluid coupling 20.

As best illustrated in FIGS. 3 through 6, it can be shown that the fluid distribution assembly 18 according to the present invention 10 preferably comprises an elongated main fluid conduit 24 extending through the interior of the holding tank 12. A plurality of lateral conduits 26 are arranged parallel to each other, and are in fluid communication with the elongated main fluid conduit 24. The lateral conduits are positioned approximately between 10 inches to about 16 inches apart. The lateral conduits 26 are projected laterally with respect to the elongated main fluid conduit 24, and function by distributing water towards opposed side walls of the holding tank 12. To this end, the lateral conduits 26 include a plurality of openings 28 through which a pressurized spraying of fluid is released from the conduits 26 and into the holding tank 12. If desired, the elongated main fluid conduit 24 may also include openings 28 located at any position so as to allow the spraying of fluid in any desired direction to clean the interior surfaces of the holding tank 12.

Figure 5:
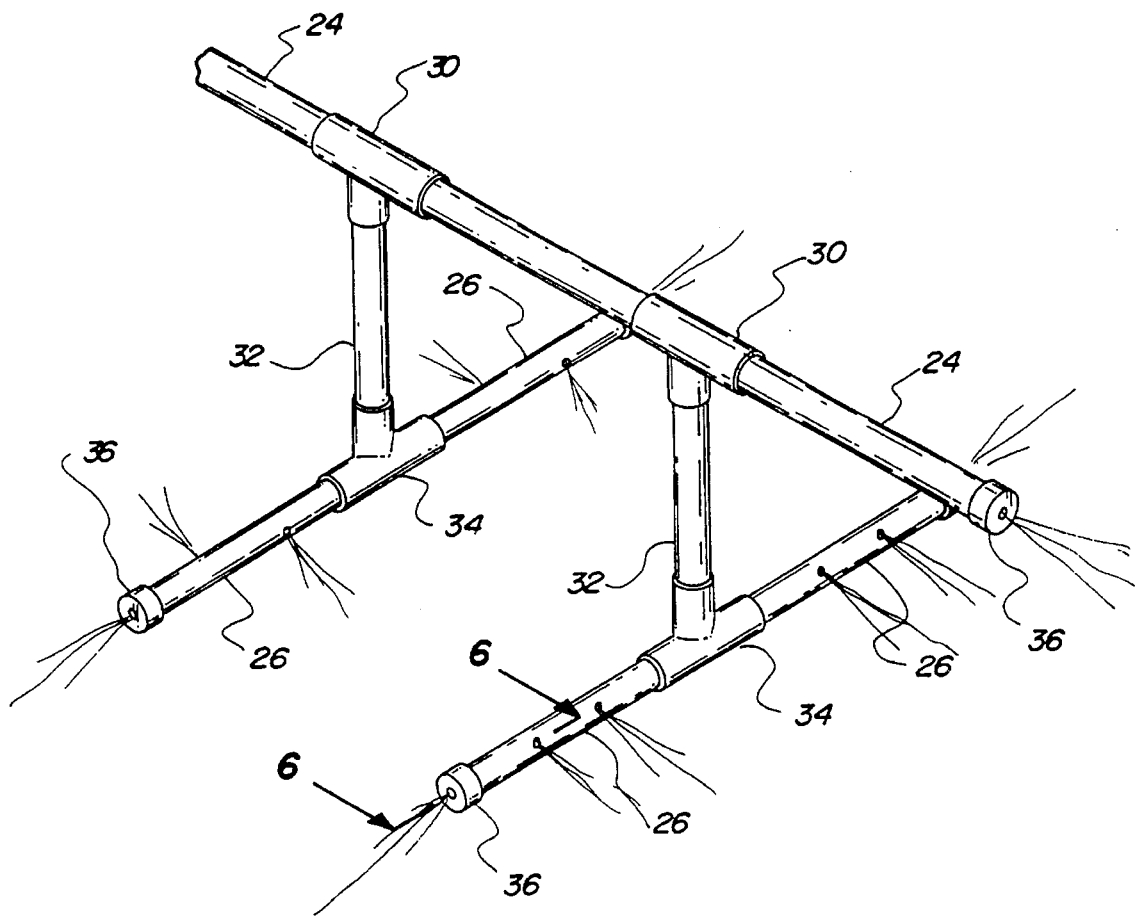
FIG. 5 is an isometric illustration of a portion of a water distributing means of the invention.
Figure 6:
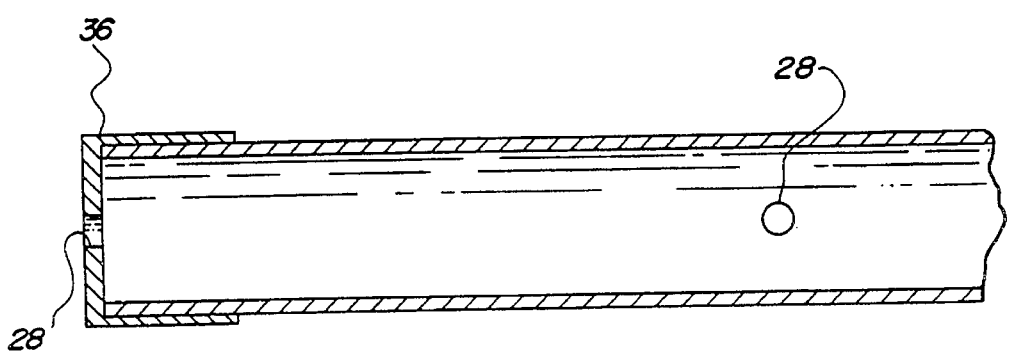
FIG. 6 is a cross sectional view taken along line 6—6 of FIG. 5.

Specifically, and as shown in FIG. 5, elongated the main fluid conduit 24 includes a plurality of upper T-connectors 30 providing fluid communication and orthogonal mounting to a plurality of vertical conduits 32 extending from the upper T-connectors. A lower T-connector 34 is coupled to the lower distal end of each of the vertical conduits 32 and mounts the lateral conduits 26 in fluid communication with the vertical conduits. The lateral conduit 26 extends from the lower T-connector 34 and terminates in outer distal ends to which end caps 36 are secured. There is at least one opening 28 in the end caps 36, as shown in FIG. 6, to facilitate the pressurized distribution or spray of fluid within the holding tank 12. By this structure, a pressurized injection of fluid into the fluid distribution assembly 18 will effect spraying and mechanical fluid cleaning of the interior surfaces of the holding tank 12.

The elongated main conduit and the lateral and vertical conduits may be constructed out of any type of material that will be firm enough to withstand the pressure of the fluid which travels therein. Preferably, the conduits are made of plastic or some other metal tubing. The diameter of the tubing for the elongated main fluid conduit 24 is between about ½ inch and about ¾ inch. The diameter of the lateral conduits 26 ranges between about ⅜ inch to about ⅝ inch, while the diameter of the vertical conduits 32 ranges between about 7/16 inch to about ⅝ inch. With respect to the openings 28, the diameter ranges between ⅛ inch to about ¼ inch.

Figure 4:
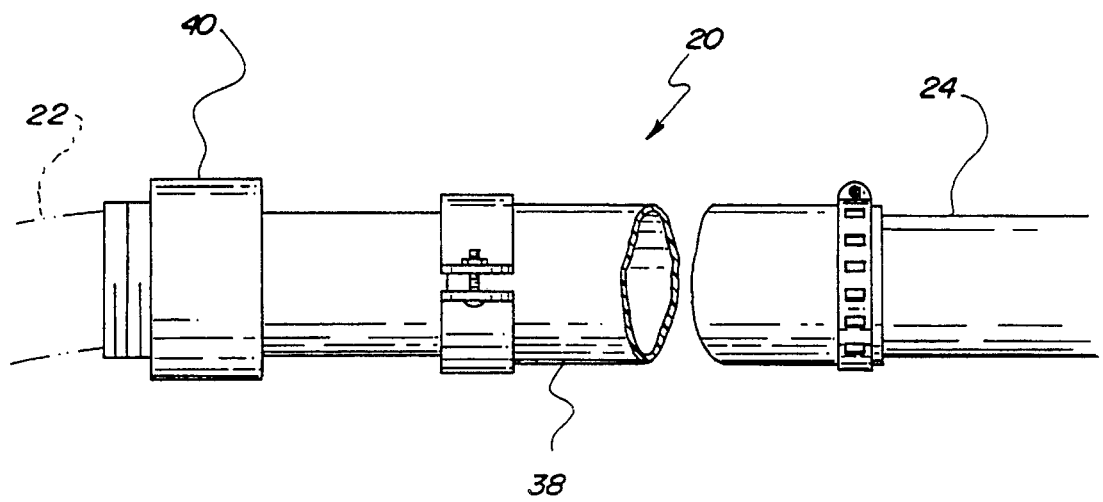
FIG. 4 is an end elevation view, partially in cross section, of a fluid coupling of the invention.

Referring now to FIG. 4, it can be shown that the fluid coupling 20 according to the present invention 10 preferably comprises flexible tubing 38 connected at one end to the elongated main fluid conduit 24; a threaded coupling 40 connected to a second end of the flexible tubing 38; and a fluid supply conduit 22 connected to the opposing end of the threaded coupling 40. The fluid coupling 20 extends through an opening in a side of the holding tank 12. A conventionally known and readily available fluid supply conduit 22 can be utilized to supply pressurized fluid to the fluid distribution 18 so as to effect cleaning of an interior of the holding tank 12.

In use, the tank internal surface rinsing system according to the present invention can be easily utilized to effect quick and efficient cleaning of an interior of a holding tank 12 of a recreational vehicle or the like. The present invention 10 serves to substantially eliminate repeated rinsing of the interior of the holding tank 12 through repeated periodic filling and emptying as is done with prior art methods. Thus, the present invention conserves water and reduces an amount of time needed to effect cleaning of an interior of a holding tank 12.

It is contemplated that the tank internal surface cleaning system will be installed in the holding tank of recreational vehicles or the like by the manufacturer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention are deemed readily apparent and obvious to one skilled in the art, and all equivalent relationships to those illustrated in the drawings and described in the specification are intended to be encompassed by the present invention.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tank internal surface cleaning system comprising:

a holding tank for retaining fluids; and a fluid distribution assembly mounted within the holding tank for directing pressurized fluid towards interior surfaces of the holding tank, wherein the fluid distribution assembly comprises an elongated main fluid conduit extending through an interior of the holding tank; and a plurality of lateral conduits positioned in fluid communication with the elongated main fluid conduit and projecting laterally thereof for distributing fluid towards opposed side walls of the holding tank, the lateral conduits each having a plurality of openings positioned along the body of the conduit and at least one opening at each outer distal end of the conduit.

2. The tank internal surface cleaning system of claim 1, wherein the holding tank includes a fluid inlet and a drain outlet.

3. The tank internal surface cleaning system of claim 1, including a fluid coupling projecting exteriorly of the holding tank for connecting the fluid distribution assembly to a fluid supply conduit.

4. A tank internal surface cleaning system comprising:

a holding tank for retaining fluids;

a fluid distribution assembly mounted within the holding tank for directing pressurized fluid towards interior surfaces of the holding tank; and a fluid coupling projecting exteriorly of the holding tank for connecting the fluid distribution assembly to a fluid supply conduit, wherein the fluid coupling comprises flexible tubing connected at one end to an elongated main fluid conduit; a threaded coupling connected to a second end of the flexible tubing; and a fluid supply conduit connected to the opposite end of the threaded coupling.

5. A tank internal surface cleaning system comprising:

a holding tank for retaining fluids;

a fluid distribution assembly mounted within the holding tank for directing pressurized fluid towards interior surfaces of the holding tank; and a fluid coupling projecting exteriorly of the holding tank for connecting the fluid distribution assembly to a fluid supply conduit, wherein the fluid coupling comprises flexible tubing connected at one end to an elongated main fluid conduit, the flexible tubing comprising transparent material; a threaded coupling connected to a second end of the flexible tubing; and a fluid supply conduit connected to the opposite end of the threaded coupling.

6. The tank internal surface cleaning system of claim 5, wherein the transparent material is plastic tubing.

7. A tank internal surface cleaning system comprising:

a holding tank for retaining fluids; and a fluid distribution assembly mounted within the holding tank for directing pressurized fluid towards interior surfaces of the holding tank, wherein the fluid distribution assembly comprises an elongated main fluid conduit extending through an interior of the holding tank; and a plurality of lateral conduits positioned in fluid communication with the elongated main fluid conduit and projecting laterally thereof for distributing fluid towards opposed side walls of the holding tank, the lateral conduits each having a plurality of openings positioned along the body of the conduit and at least one opening at each outer distal end of the conduit, and further including end caps each enclosing the outer distal ends of the lateral conduits, and having at least one opening.

8. The tank internal surface cleaning system of claim 1, wherein the opening ranges between ⅛ inch to about ¼ inch in diameter.

9. The tank internal surface cleaning system of claim 1, wherein the dimensions of the cleaning system are between about 18 inches to about 25 inches wide, about 50 inches to about 60 inches long, and about 2 inches to about 8 inches high.

10. The tank internal surface cleaning system of claim 1, wherein the plurality of lateral conduits are positioned parallel to each other and perpendicular to the elongated main fluid conduit.

11. The tank internal surface cleaning system of claim 10, wherein the lateral conduits are positioned approximately between 10 inches to about 16 inches apart.

12. A fluid distribution assembly comprising:

an elongated main fluid conduit extending through an interior of a holding tank; and a plurality of lateral conduits positioned in fluid communication with the elongated main fluid conduit and projecting laterally thereof for distributing fluid towards opposed side walls of the holding tank, the lateral conduits each having a plurality of openings positioned along the body of the conduit and at least one opening at each outer distal end of the conduit.

13. The fluid distribution assembly of claim 12, further comprising a plurality of upper T-connectors each coupled to the elongated main fluid conduit; a plurality of lower T-connectors each coupled to at least one lateral conduit; and a plurality of vertical conduits each having upper and lower ends with the upper end connected to the elongated main fluid conduit by an upper T-connector and the lower end connected to at least one lateral conduit by a lower T-connector.

14. The fluid distribution assembly of claim 13, wherein the vertical conduits are between approximately 2 and 8 inches in length.

15. The fluid distribution assembly of claim 13, wherein the diameter of the vertical conduits ranges between 7/16 and ⅝ inch.

16. The fluid distribution assembly of claim 12, further including end caps each enclosing the outer distal ends of the lateral conduits, and having at least one opening.

17. The fluid distribution assembly of claim 12, wherein the opening ranges between ⅛ inch to about ¼ inch in diameter.

18. The fluid distribution assembly of claim 12, wherein the plurality of lateral conduits are positioned parallel to each other and perpendicular to the elongated main fluid conduit.

19. The fluid distribution assembly of claim 12 wherein the elongated main fluid conduit is between approximately 34 inches and 50 inches in length.

20. The fluid distribution assembly of claim 12, wherein the lateral conduits are between approximately 18 and 30 inches in length.

21. The fluid distribution assembly of claim 12, wherein the diameter of the lateral conduits ranges between ⅜ inch and ⅝ inch.

22. A tank internal cleaning system comprising:

a holding tank for retaining fluids;

a fluid distribution assembly mounted within the holding tank for directing pressurized fluid towards interior surfaces of the holding tank, the fluid distribution assembly comprising an elongated main fluid conduit extending through an interior of the holding tank; and a plurality of lateral conduits positioned in fluid communication with the elongated main fluid conduit and projecting laterally thereof for distributing fluid towards opposed side walls of the holding tank, the lateral conduits each having a plurality of openings positioned along the body of the conduit and at least one opening at each outer distal end of the conduit; and a fluid coupling projecting exteriorly of the holding tank for connecting the fluid distribution assembly to a fluid supply conduit.

23. The tank internal surface cleaning system of claim 22, wherein the holding tank includes a fluid inlet and a drain outlet.

24. The tank internal surface cleaning system of claim 22, wherein the fluid coupling comprises flexible tubing connected at one end to an elongated main fluid conduit; a threaded coupling connected to a second end of the flexible tubing; and a fluid supply conduit connected to the opposite end of the threaded coupling.

25. The tank internal surface cleaning system of claim 24, wherein the flexible tubing comprises transparent material.

26. The tank internal surface cleaning system of claim 25, wherein the transparent material is plastic tubing.

27. The tank internal surface cleaning system of claim 22, further including end caps each enclosing the outer distal ends of the lateral conduits, and having at least one opening.

28. The tank internal surface cleaning system of claim 22, wherein the dimensions of the cleaning system are between about 18 inches to about 25 inches wide, about 50 inches to about 60 inches long, and about 2 inches to about 8 inches high.

* * * * *